(12) United States Patent
Jeong

(10) Patent No.: US 6,741,597 B1
(45) Date of Patent: May 25, 2004

(54) APPARATUS AND METHOD FOR MANAGING TRAFFIC OF AN ASYNCHRONOUS TRANSFER MODE (ATM) SWITCHING SYSTEM

(75) Inventor: Yong Geun Jeong, Anyang (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/517,160

(22) Filed: Apr. 5, 2000

(30) Foreign Application Priority Data

Apr. 6, 1999 (KR) .......................... 1999/11853

(51) Int. Cl.[7] .............................................. H04L 12/28
(52) U.S. Cl. ................................................. 370/395.21
(58) Field of Search ....................... 370/395.21, 395.43, 370/395.31, 395.2, 397, 399, 230, 253, 232, 233, 252, 392

(56) References Cited

U.S. PATENT DOCUMENTS 4,755,986 A * 7/1988 Hirata
5,758,089 A * 5/1998 Gentry et al. ............... 709/234
5,959,994 A * 9/1999 Boggs et al. ............... 370/399
5,991,274 A * 11/1999 Grunenfelder et al. ...... 370/253
6,108,303 A * 8/2000 Fahmi et al. ............... 370/230
6,377,549 B1 * 4/2002 Ngo et al. .................. 370/233

* cited by examiner

*Primary Examiner*—Chi Pham
*Assistant Examiner*—Alexander O. Boakye
(74) *Attorney, Agent, or Firm*—Fleshner & Kim, LLP

(57) ABSTRACT

An apparatus for managing traffic of an ATM switching system is provided which separates and stores an input ATM cell as a header part and a data part. A traffic control memory stores an input coefficient value of an ATM cell and a traffic parameter contracted when a call was established, and a traffic control unit determines if the ATM cell conforms with the contract. And, the traffic parameter of the ATM cell and a GCRA parameter stored in the traffic control memory are compared in the discriminated conformance type, thereby performing the traffic management operation such as tagging, discarding and policing for the ATM cell. Accordingly, since various conformance definitions can be supported for the input ATM cell, an effective traffic management function can be obtained.

27 Claims, 8 Drawing Sheets

FIG. 6

| CONFORMANCE DIFINITION | CONTENT | GCRA PARAMETER | CONFORMING CLP=1 | CONFORMING CLP=0 | TAGGING | CELL LOSS RATIO APPLICATION |
|---|---|---|---|---|---|---|
| CBR.1 | PCR0+1 | $T_{0+1}$, CDVT | ○ | | – | CLP=0+1 |
| VBR.1 | PCB0+1 | $T_{0+1}$, CDVT | ○ | | – | CLP=0+1 |
|  | SCB0+1 | $T_{S0+1}, BT_{0+1}$+CDVT | | | | |
| VBR.2 | PBR.0+1 | $T_{0+1}$, CDVT | ○ | ○ | NO | CLP=0 |
|  | SCR0 | $T_{S0}, BT_0$+CDVT | × | | | |
| VBR.3 | PCR0+1 | $T_{0+1}$, CDVT | ○ | ○ | – | CLP=0 |
|  | SCR0 | $T_{S0}, BT_0$+CDVT | × | | SCR0→PCR0+1 | |
| UBR.1 | PCR0+1 | $T_{0+1}$, CDVT | ○ | | – | – |
| UBR.2 | PCR0+1 | $T_{0+1}$, CDVT | ○ | | YES | |
| ABR | PCR0 | $T_0, \tau_1$ | – | ○ | – | – |

$T_S$ = AVERAGED CELL ARRIVAL TIME

FIG. 7A

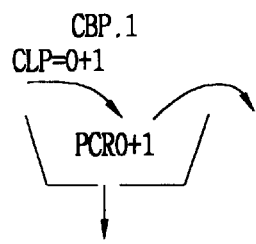

FIG. 7B

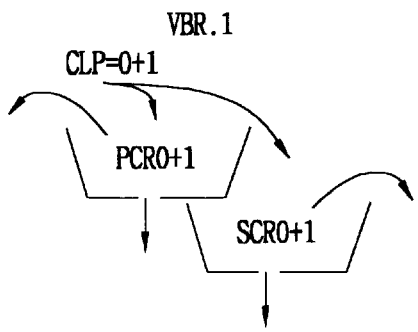

FIG. 7C

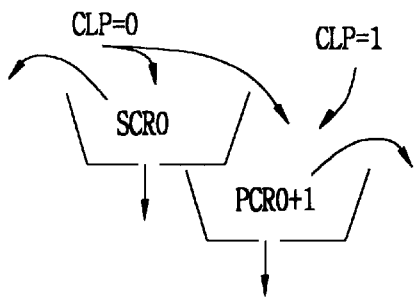

| | 63 | | | 0 |
|---|---|---|---|---|
| 0x00 | CT✕ | IF1 | LF1 | TAT1 |
| 0x01 | ICC1 | | NCC1 | |
| 0x02 | ✕ | IF2 | LF2 | TAT2 |
| 0x03 | ICC2 | | NCC2 | |

FIG. 10

| | | 63 | | | |
|---|---|---|---|---|---|
| | 0x00000 | CT ⊠ | IF1 | LF1 | TAT1 |
| VPI/VCI | 0x00001 | | ICC1 | | NCC1 |
| =0/0 | 0x00010 | ⊠ | IF2 | LF2 | TAT2 |
| | 0x00011 | | ICC2 | | NCC2 |

...

| | 0x3FFC | CT ⊠ | IF1 | LF1 | TAT1 |
|---|---|---|---|---|---|
| VPI/VCI | 0x3FFD | | ICC1 | | NCC1 |
| =31/1023 | 0x3FFE | ⊠ | IF2 | LF2 | TAT2 |
| | 0x3FFF | | ICC2 | | NCC2 |

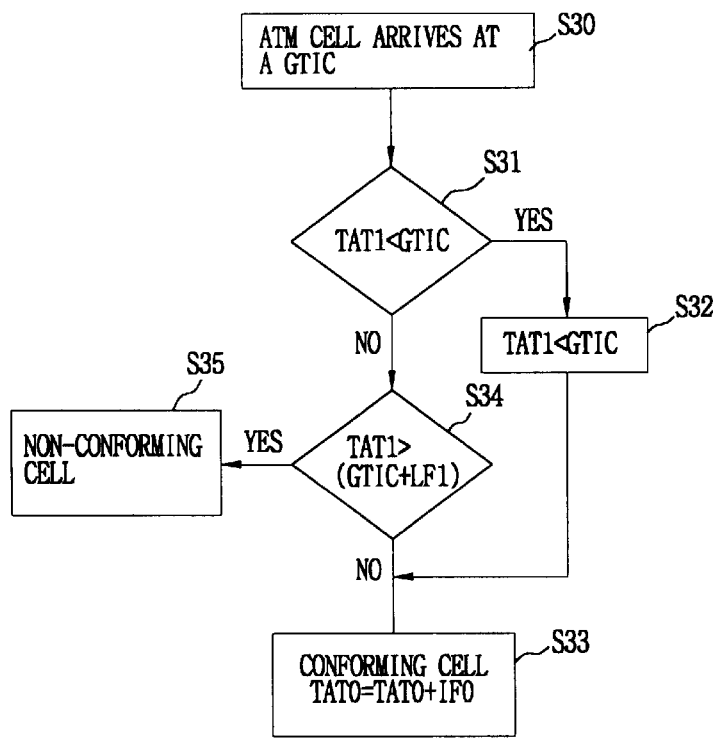
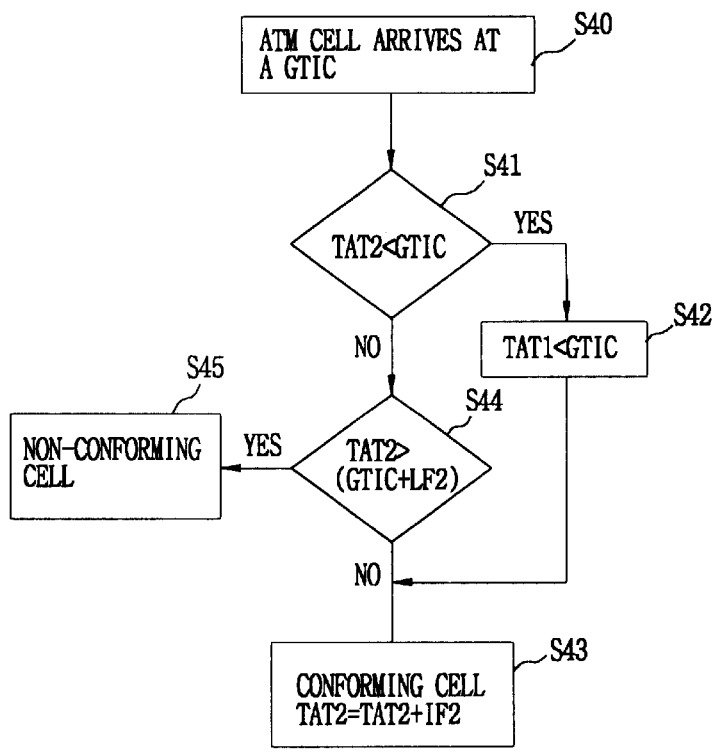

APPARATUS AND METHOD FOR MANAGING TRAFFIC OF AN ASYNCHRONOUS TRANSFER MODE (ATM) SWITCHING SYSTEM

BACKGROUND OF THE INVENTION

1. Field of the Invention

The present invention relates to an Asynchronous Transfer Mode (ATM) switching system, and more particularly, to an apparatus and method for managing traffic of an ATM switching system, and to its method.

2. Background of the Related Art

An ATM switching system has a limited amount of bandwidth. Accordingly, only a predetermined amount of information per unit time can be transferred through a network. In order to allocate usable bandwidth in the network, a system provider and a system user should agree on a 'traffic contract' that defines 'traffic parameters', a source traffic descriptor, and a connection traffic descriptor at an initial stage of a system, that is, when a call is established.

Normally, traffic parameters are variables representing traffic characteristics of a terminal that generates traffic, which include four elements as shown in Table 1.

TABLE 1

| Traffic parameter | Formula | Unit | Content |
|---|---|---|---|
| PCR (Peak cell rate) | 1/T | Cell/sec | T: time of minimal interval of cells |
| SCR (Sustainable cell rate) | MBS/T | Cell/sec | Maximum average transfer rate of ON-OFF burst traffic |
| MBS (Maximum burst size | MBS | Cell | Number of maximum transfer cell in PCR |
| MCR (Minimum cell rate) | | Cell/sec | |

As used herein, 'T' indicates a maximum burst interval time.

The source traffic descriptor defines traffic characteristics of a terminal when a call is established, in order to satisfy a quality of service (QoS, i.e., delay, cell loss and throughput) of a cell to be established.

The source traffic descriptor is constructed using a combination of the traffic parameters and the cell delay variation tolerance (CDVT) of Table 1. FIGS. 1A and 1B respectively show constant bit rate (CBR) traffic parameters (PCR and CDVT), and variable bit rate (VBR) traffic parameters (PCR, CDVT, SCR and MBS).

The connection traffic descriptor represents traffic characteristics of an ATM connection, including the source traffic descriptor, CDVT, and elements defining a conformance of a cell.

When the ATM connection is made after the system provider and the user agree on the communication 'traffic contract,' a generic cell rate algorithm (GCRA) having a traffic policing function in a network interface determines whether input cells comply with the traffic contract. That is, it identifies whether the cells inputted from the terminal match the traffic parameters stipulated in the initial traffic contract, and then performs the operations of tagging, discarding, and monitoring depending on whether the cells break the contract or not.

The GCRA is implemented by a Virtual Scheduling Algorithm (VSA) or a Leaky Bucket Algorithm (LBA) described in a CCITT Recommendation 1.371 Document, Geneva 1999, and normally defined using an 'Increment (I)' parameter and a 'Limit (L)' parameter.

FIG. 2 illustrates a GCRA implemented by the VSA.

As shown in FIG. 2, when a cell is received in step S10, the VSA checks whether the arrival time $t_a(k)$ of kth cell is greater than a theoretical arrival time (TAT) in step S11. If the arrival time $t_a(k)$ of the cell is greater than the TAT, that is, if the cell arrives after the TAT, the VSA regards the corresponding cell as a conforming cell and updates the TAT to an added value of the arrival time $t_a(k)$ of the cell and an Increment (I) in steps S12 and S13. If, however, the arrival time $T_a(k)$ of the kth cell is not greater than the TAT, that is, if the cell arrives before the theoretical arrival time TAT, the VSA determines whether the kth cell arrives beyond the Limit (L) value before the theoretical arrival time TAT, in step S14. Upon making that determination, if the kth cell arrives beyond the Limit (L), that is, the arrival time of the kth cell is smaller than the TAT-L, the VSA regards the corresponding cell as a non-conforming cell and does not modify the TAT in step S15.

FIG. 3 illustrates cell conformance checking by the VSA having an Increment (I=5) and a Limit (L=9).

In step S11 (FIG. 2), since the arrival time $T_a(3)=11$ of the third cell is greater than the TAT(3)=10, the VSA updates the TAT(3) of the third cell to '11' rather than '10' in step S12. The VSA then updates the TAT(4) of the fourth cell to '16' by increasing by Increment (I=5) over the previous value in step S13.

Though arrival times $t_a(k)$ of the remaining cells, except for the seventh and the tenth cells, are not all greater than the TAT, since they are not smaller than the TAT in steps S11 and S14, the VSA regards the corresponding cells as conforming, and increases the TAT as much as the Increment (I=5) than before in the step S13.

In this respect, since the arrival times $t_a(7)$ and $t_a(10)$ of the seventh and the tenth cells are each smaller beyond the Limit (L=9) than the TAT(7) and the TAT(10) in steps S11 and S14, the VSA regards the seventh and the tenth cells as non-conforming cells and thus does not increase the TAT(7) and the TAT(10) in step S15.

FIG. 4 illustrates the GCRA implemented by LBA.

The Leaky Bucket Algorithm is a model in which a constant amount of traffic cells come in and go out, of which an input cell overflowing the bucket is tagged or discarded according to the resource environment of the system. Thus, if the content of the bucket is not overflowing, incoming cells are conforming. Otherwise, the cells are non-conforming.

Referring to FIG. 4, when the cell is received in step S20, the LBA first computes the temporary bucket counter value X' in step S21. The temporary bucket counter X' is defined as a value obtained by subtracting the arrival time $t_a(k)$ of the cell from an addition value (X+LCT) of a leaky bucket counter value X and a last compliance time (LCT) representing an input time of a last conforming cell, and the leaky bucket counter value X is decreased by 1 at every unit time.

After the temporary bucket counter value X' is computed, the LBA checks whether the computed temporary bucket counter value X' is smaller than '0' in step S22, and if the value X' is smaller than 0, the LBA sets the corresponding temporary bucket counter X' to 0 in step S23.

Accordingly, the LBA regards the input cell as a conforming cell and updates the leaky bucket counter value X to the sum of the temporary bucket counter X' and the Increment (I), and updates the LCT to the arrival time $t_a(k)$ of the cell in step S24.

If, however, the temporary bucket counter value X' is not smaller than 0 in step S22, the LBA checks whether the corresponding temporary bucket counter X' exceeds the Limit (L) of the bucket in step S25. If the temporary bucket counter X' exceeds the Limit (L) of the bucket, the LBA regards the input cell as a non-conforming cell, and does not modify the leaky bucket counter value X and the LCT in step S26. If, on the other hand, the temporary bucket counter X' does not exceed the Limit (L) of the bucket, it regards the input cell as a conforming cell and increases the bucket counter, as shown in step S24.

FIG. 5 illustrates cell conformance checking by the LBA using an Increment (I=5) and a Limit (L=9).

If the arrival time $t_a(2)$ of the second cell is 5, the temporary bucket counter value X' in the step S21 is −5. That is, the temporary bucket counter value X' is determined by a value obtained by subtracting the difference (5−0=5) of the LCT of the first cell and the arrival time $t_a(2)$ of the second cell, from the count value (X=0) of the leaky bucket counter of the first cell. In this respect, upon checking in step S22, since the temporary bucket counter (X' =−5) is smaller than 0, the temporary bucket counter X' of the second cell in steps S23 and S24 is set as 0, and the leaky bucket counter value X and the LCT are respectively set as 5.

If the arrival time $t_a(3)$ of the third cell is 11, the temporary bucket counter X' in the step S21 is −1. That is, the temporary bucket counter X' is determined by a value obtained by subtracting the difference (11−5=6) of the LCT of the second cell and the arrival time $t_a(3)$ of the third cell, from the count value (X=5) of the leaky bucket counter of the second cell. In this respect, since the computed temporary bucket counter value (X' =−1) is smaller than 0, the temporary bucket counter value X' of the third cell in the steps S23 and S24 is set as 0, and the leaky bucket counter value X is set as 5, while the LCT is set as 11. The LBA sequentially checks the conformance for the input cells in this manner.

In this example, the seventh cell arrives when $t_a(7)=21$. The temporary bucket counter value X' in step S21 accordingly becomes 10. Since the temporary bucket counter value (X' =10) is greater than 0 in step S22 and is greater than the Limit (L=9) in step S25, the LBA tags or discards the seventh cell, and does not modify either the leaky bucket counter value X or the LCT in step S26. Thus, the leaky bucket counter value X and the LCT of the seventh cell is the same as the leaky bucket counter value X and the LCT of the sixth cell, respectively.

Recommendation 1.371 and the ATM Forum traffic Management 4.0 of the International Telecommunication Union-Telecommunication Standardization Sector (ITU-T), defining the traffic control and congestion control in a broad band-integrated service digital network (B-ISDN), defines the GCRA variables according to a peak cell rate (PCR) traffic parameter and a sustainable cell rate (SCR) traffic parameter, as shown in Table 2.

TABLE 2

| Conformance checking | Increment | Limit |
| --- | --- | --- |
| Peak rate | PCR | CDVT |
| Sustainable | SCR | Burst Tolerance |

As shown here, the burst tolerance (BT) indicates a maximum time for processing a cell, which is represented as BT=(MSB−1)(1/SCR−1/PCR).

In order to define conformance of the CBR and the VBR connection, the ITU-T Recommendation 1.371 and the ATM Forum Traffic Management 4.0 define PCR, SCR, CDVT and BT, respectively. Here, a conformance for the traffic cell of a connected call is defined related to the traffic descriptor determined when the call is established.

However, in the conventional ATM switching system, various conformance definitions are not supported for the input ATM cell, resulting in failure to provide an effective traffic management function.

The above references are incorporated by reference herein where appropriate for appropriate teachings of additional or alternative details, features and/or technical background.

SUMMARY OF THE INVENTION

An object of the present invention is to provide an apparatus and/or method for managing ATM traffic which substantially overcomes one or more of the limitations and disadvantages caused by the problems with the conventional art.

Another object of the present invention is to provide an apparatus and method for managing traffic of an ATM switching system which is capable of effectively managing ATM traffic by supporting various conformance definitions for an ATM cell.

To achieve these and other advantages in whole or in parts and in accordance with the purpose of the present invention, as embodied and broadly described herein, there is provided an apparatus for managing traffic of an ATM switching system including: an input cell processing unit for separating an input ATM cell to a header part and a data part, a header queue for storing the header part separated in the input cell processing unit, a traffic control memory for storing an input coefficient value of an ATM cell and a traffic parameter contracted when a call was established, a traffic control unit for determining a conformance measurement type of the input ATM cell and comparing traffic information of the ATM cell in the determined conformance measurement type and the traffic parameter contracted when the call was established to discriminate a conformance of the cell, and a memory connection unit for accessing the traffic control memory, transferring the traffic information of the ATM cell to the traffic control unit, and storing a processing result of the traffic control unit in the traffic control memory.

In order to attain the above objects, there is also provided a method for managing traffic of an ATM switching system including the steps of: storing a traffic parameter as contracted when a call is established in a traffic control memory, separating an input ATM cell to a header part and a data part and storing them in a header queue and a data queue, reading a Virtual Path Identifier/Virtual Channel Identifier (VPI/VCI) field stored in the header queue and accessing a traffic management content (TMC) unit of the traffic control memory, and determining a predetermined conformance measurement type on the basis of a bit value of a conformance type field of the TMC unit and checking a conformance of the ATM cell according to the determined conformance measurement type.

To further achieve at least the above-described objects of the present invention in a whole or in parts, there is provided an asynchronous transfer mode (ATM) switching system that includes input circuit coupled to receive an ATM cell having a header part and a data part, an ATM control unit coupled to receive only the header part of the ATM cell and determine a conformance of the ATM cell based on information from the header part and a traffic parameter stored in the ATM control unit, and an output circuit coupled to receive and combine the output of the ATM header and cell data for conforming cells, and to discard the ATM data of non-conforming cells.

To further achieve at least the above-described objects of the present invention in a whole or in parts, there is provided a method for managing traffic of an Asynchronous Transfer Mode (ATM) switching system including the steps of separating a header part of an ATM cell, accessing a traffic control memory based on a first field of the header part to obtain a traffic management content (TMC), and determining a prescribed conformance measurement type on the basis of a field value of the TMC and ascertaining a conformance of the ATM cell based on the prescribed conformance measurement type.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 6 illustrates a conformance definition provided in the ATM connection in accordance with a preferred embodiment of the present invention;

FIGS. 7A through 7G illustrate leaky bucket modeling representing the conformance definitions of FIG. 6;

FIG. 10 illustrates an address map of the traffic control memory allocated in each of VPI and VCI of FIG. 8; and FIGS. 11A and 11B are flow charts of discriminating a conformance of the ATM cell in the apparatus for managing traffic of the ATM switching system in accordance with a preferred embodiment of the present invention.

DETAILED DESCRIPTION OF PREFERRED EMBODIMENTS

Reference will now be made in detail to the preferred embodiments of the present invention, examples of which are illustrated in the accompanying drawings.

The conformance of a traffic cell, for example an ATM cell, of a connected call is defined related to a traffic descriptor, which is determined when the call is established. FIG. 6 illustrates the conformance definition provided in the ATM connection.

The constant bit rate CBR.1 refers to a service class for an ATM cell related to voice. The variable bit rate VBR.1, VBR.2, and VBR.3 refer to a service class for an ATM cell related to data or compressed audio/video. The unspecified bit rate UBR.1 and UBR.2 refer to a service class for an ATM cell related to electronic mail or a file that is not sensitive to a cell loss or a delay, and the available bit rate ABR refers to a service class for an ATM cell related to traffic of a local area network (LAN). A leaky-bucket model for the conformance definitions is shown in FIGS. 7A through 7G.

Figure 1A:
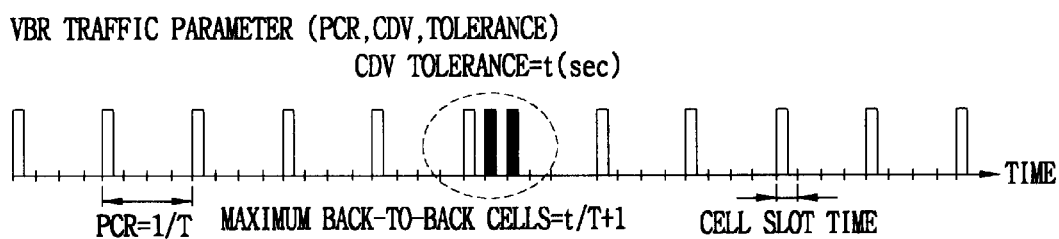
FIG. 1A illustrates a traffic descriptor for a constant bit rate consisting of a combination of a general traffic parameter and a Cell Delay Variation Tolerance (CDVT) in accordance with a conventional art.
Figure 1B:
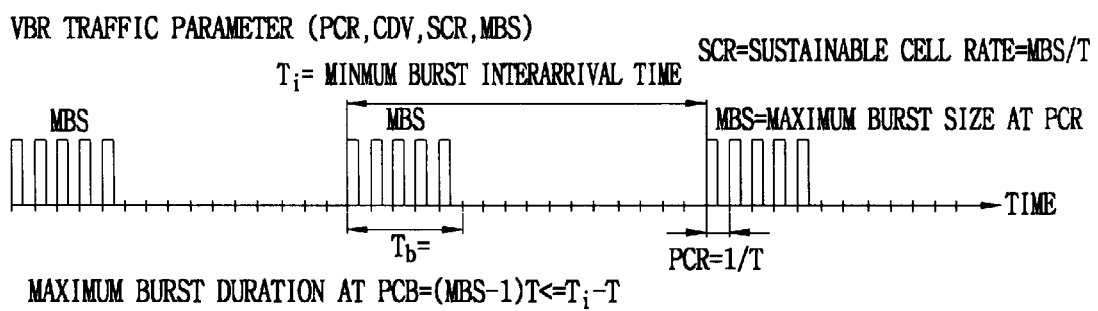
FIG. 1B illustrates a traffic descriptor for a variable bit rate.
Figure 2:
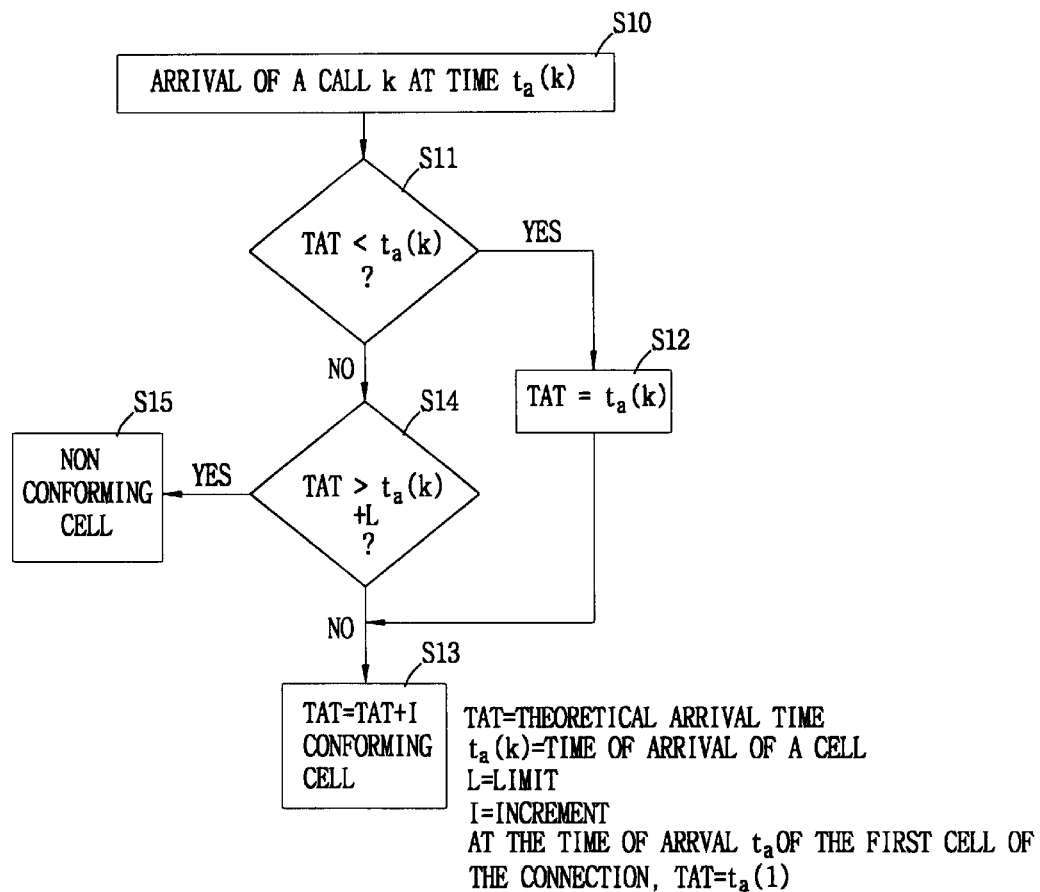
FIG. 2 illustrates a conventional generic cell rate algorithm (GCRA) implemented by a virtual scheduling algorithm (VSA)
Figure 3:
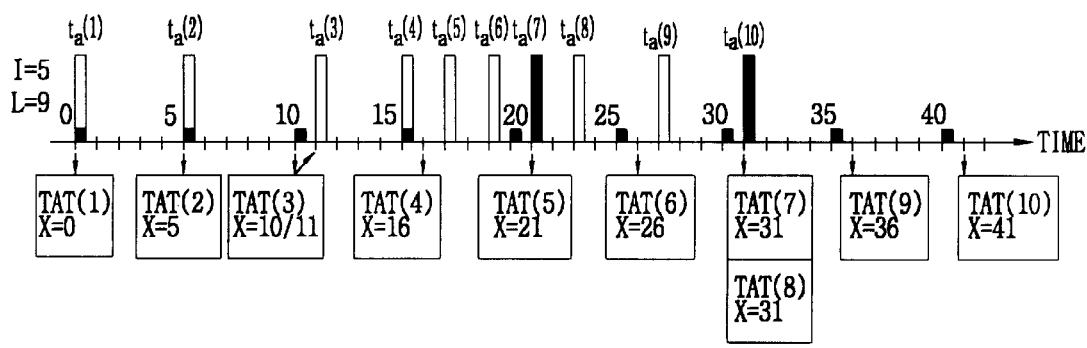
FIG. 3 illustrates a conventional cell conformance checking by the VSA defined by Increment(I=5) and Limit (L=9)
Figure 4:
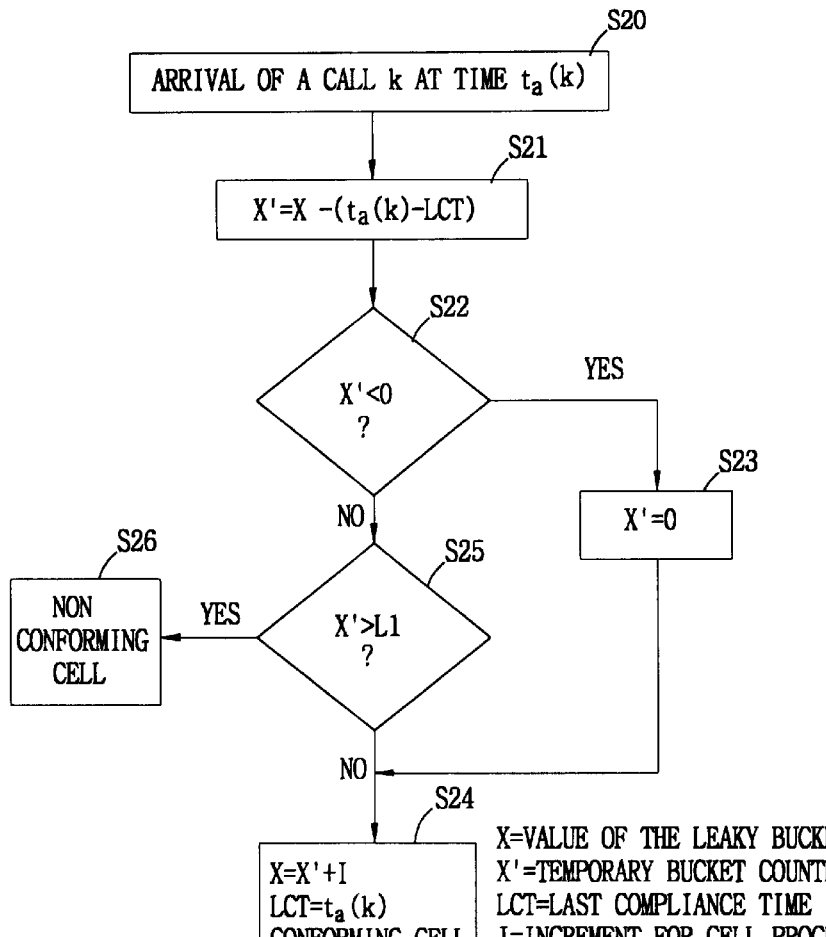
FIG. 4 illustrates a conventional GCRA implemented by a leaky bucket algorithm (LBA)
Figure 5:
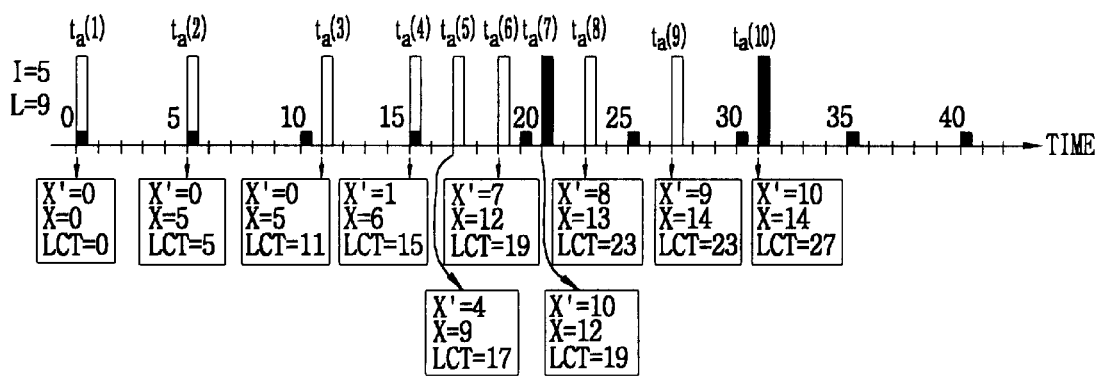
FIG. 5 illustrates a conventional cell conformance checking by the LBA defined by Increment(I=5) and Limit(L=9)
Figure 7D:
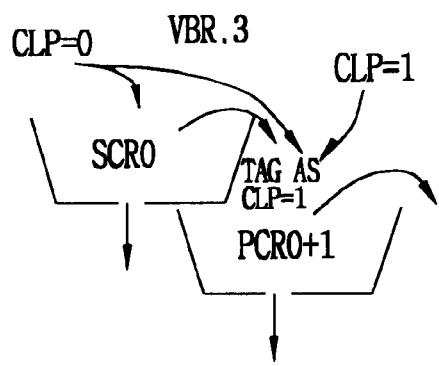
Figure 7E:
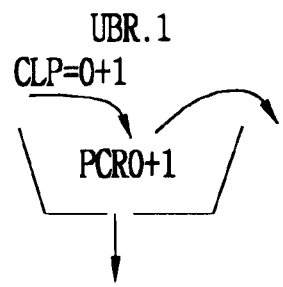
Figure 7F:
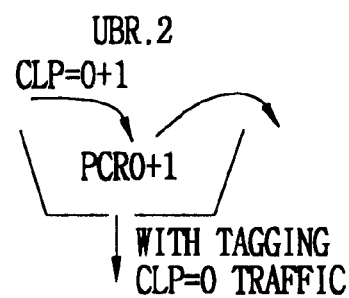
Figure 7G:
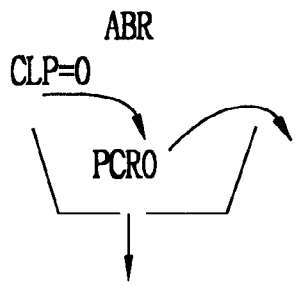
Figures 8, 9:
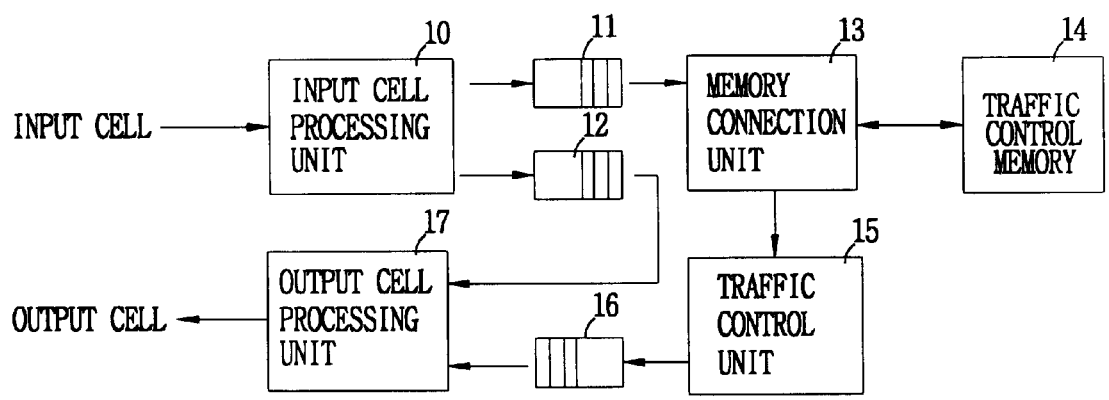
FIG. 8 is a schematic block diagram of an apparatus for managing traffic of an ATM switching system in accordance with a preferred embodiment of the present invention.
FIG. 9 shows a structure of a traffic control memory of FIG. 8.

In order to support such conformance definitions, as shown in FIG. 8, the apparatus for managing traffic of the ATM switching system in accordance with a preferred embodiment of the present invention preferably includes an input cell processing unit 10, a header queue 11, and a data queue 12. The system also includes a memory connection unit 13, and a traffic control memory 14. Also provided are a traffic control unit 15, a conversion header queue 16, and an output cell processing unit 17.

The input cell processing unit 10 separates the input ATM cell to a header part and a data part. The header queue 11 stores a 4-byte header, except for the header error check (HEC) field, which is separated out of the header part in the input cell processing unit 10. The data queue 12 stores the data part, that is, the 48-byte payload, which separated out by the input cell processing unit 10.

The memory connection unit 13 analyzes the header of the ATM cell stored in the header queue 11, reads traffic parameters from the traffic control memory 14, and outputs them to the traffic control unit 15. The memory connection unit also causes the cell conformance processing result of the traffic control unit 15 to be stored in the traffic control memory 14. The traffic control memory 14 also stores the traffic parameter contracted when the call was established and an input coefficient of the input ATM cell.

The traffic control unit 15 determines a conformance measurement type of the input ATM cell. It further determines whether the traffic information of the ATM cell read from the traffic control memory 14 in the determined conformance measurement type matches the contracted traffic parameter. Upon making such a determination, if the two pieces of traffic information match each other, the traffic control memory 14 writes the information of the header queue 11 into the conversion header queue 16, while if the two pieces of traffic information do not match, the traffic control memory 14 outputs a cell discard signal to the output cell processing unit 17.

The output cell processing unit 17 receives the outputs of the data queue 12 and the conversion header queue 16 and outputs the ATM cell according to the control signal of the traffic control unit 15. When the cell discard control signal is inputted from the traffic control unit 15, the output cell processing unit 17 reads the data stored in the data queue 12 and discards it.

The traffic control memory 14 includes a traffic management content (TMC) for storing a traffic parameter for traffic management, and a global statistic counter (GSC) unit composed of a register to store a count value related to the input ATM cell.

FIG. 9 shows a detailed structure of the TMC, and FIG. 10 illustrates an address map of the TMC allocated in each of a VPI and a VCI.

The TMC includes a conformance type (CT) field, a first increment factor (IF) field IF1, a first limit factor (LF) field LF1, a first TAT field TAT1, a first ingress cell counter (ICC) field ICC1, a first non-conforming cell counter (NCC) field NCC1, a second IF field IF2, a second LF field LF2, a second TAT field TAT2, a second ICC field ICC2, and a second NCC field NCC2.

The CT represents a conformance measurement type of the ATM cell related to the various service classes. The first and second IF fields IF1 and IF2 preferably each store a 16 bit increment 'I' parameter, which is a variable of the GCRA of the first and second buckets. The first and second LF fields LF1 and LF2 preferably each store a 16 bit Limit 'L' parameter, which is a variable of GCRA of the first and the second buckets. In this example, the first and second buckets are the same as the PCR bucket or the SCR bucket of FIG. 7.

Accordingly, the traffic control software should convert the traffic descriptor as defined when establishing the call to the 'I' parameter and the 'L' parameter of the GCRA variables.

The first and second fields TAT1 and TAT2 are each preferably 28 bit fields for storing the theoretical arrival time (TAT), which is the GCRA variable of the first and the second buckets, respectively. These values are set by adding a storage value of a global time indication counter (GTIC) register (to be described later) to a previously computed TAT.

The first and second fields ICC1 and ICC2 are preferably each respectively 32 bit fields for storing the count value of the cells inputted to the first and the second buckets. The first and second NCC fields NCC1 and NCC2 are preferably each respectively 32 bit fields for storing the count value of the discarded or tagged cells among the cells inputted to the first and the second buckets.

The GSC unit preferably includes a 32 bit total ingress cell counter (TICC) register for counting the entire input ATM cells, a 32 bit total non-conforming cell counter (TNCC) register for counting the discarded or the tagged cells among the entire input ATM cells, and a 32 bit GTIC register for counting a cell slot time and storing it, regardless of inputting of a cell.

The operation of the apparatus for managing traffic of the ATM switching system in accordance with a preferred embodiment of the present invention constructed as described above will now be described with reference to the accompanying drawings.

First, the traffic control software converts the traffic descriptor, as defined when establishing the call, to the parameters (I, L) of the GCRA and stores them in the traffic control memory 14. A preferred embodiment of the present invention can police for input and output cells as long as a count time in specific band through the global statistic counter (GSC) unit, which consists of a 32 bit counter, as shown in Table 3.

TABLE 3

| Virtual channel band | CPS (cell/s) | Count time (second) |
| --- | --- | --- |
| 2,500 Mbps | 5,849,056 | 687 |
| 622 Mbps | 1,462,264 | 2,748 |
| 155 Mbps | 365,566 | 10,534 |
| 45 Mbps | 106,132 | 36,411 |
| 34 Mbps | 80,188 | 48,090 |
| 2 Mbps | 4,830 | 814,553 |
| 1.5 Mbps | 3,537 | 1,086,147 |

When an ATM cell is inputted, the input cell processing unit 10 separates the 4 byte header and the 48 byte payload, except the HEC field, from the ATM cell and stores them in the header queue 11 and the data queue 12, respectively.

Here, the 4 byte header includes a generic flow control (GFC) field, a virtual path identifier (VPI) field, a virtual channel identifier (VCI) field, a payload type (PT) field, and a cell loss priority (CLP) field.

The memory connection unit 13 reads the lower 5 bits of the VPI and the lower 9 bits of the VCI from the VPI and VCI fields stored in the header queue 11. It then accesses the TMC of the traffic control memory 14, and outputs the TMC as shown in FIG. 6 to the traffic control unit 15.

The traffic control unit 15 selects one of the conformance measurement types illustrated in Table 4 according to the bit value of the CT field of the TMC, and executes the flow chart shown in FIGS. 11A and 11B in the selected conformance measurement type, so as to check a conformance of the ATM cell.

TABLE 4

| CT (2:0) | Conformance measurement types |
| --- | --- |
| 000 | CBR.1 |
| 001 | VBR.1 |
| 010 | VBR.2 |
| 011 | VBR.3 |
| 100 | UBR.1 |
| 101 | UBR.2 |
| 110 | ABR |
| 111 | — |

First, if the CT is '000' or '100', that is, if the input ATM cell corresponds to the CBR.1 or the UBR.1 service, the traffic control unit 15 performs the process as shown in FIG. 11A using the GTIC value provided from the GSC unit and the TAT1 and the LF1 of the TMC and thus judges the conformance of the ATM cell.

In other words, when the ATM cell is received in step S30, the traffic control unit 15 checks whether the GTIC value, that is, the arrival time of the ATM cell, is greater than the TAT1 in step S31.

If the GTIC value is greater than the TAT1, the traffic control unit 15 regards the ATM cell as a conforming cell and updates the TAT1 to a sum of the GTIC and the IF1 in steps S32 and S33. Here, the TAT1 signifies the theoretical arrival time of the ATM cell inputted to the first bucket.

On the other hand, if the GTIC value of the ATM cell is not greater than the TAT1, the traffic control unit 15 checks whether the TAT1 is greater than the sum of the GTIC1 and the LF1 in step S34.

If the TAT1 is smaller than the sum of the GTIC1 and the LF1, the traffic control unit 15 regards the ATM cell as a conforming cell and performs step S33. If, however, the TAT1 is smaller than the sum of the GTIC1 and the LF1, the traffic control unit 15 regards the ATM cell as a non-conforming cell and does not update the TAT1, as shown in step S35.

Accordingly, if the ATM cell is regarded as a conforming cell, the traffic control unit 15 stores the TAT1 updated in step S33 in the TAT1 field of the traffic control memory 14, and writes the header information stored in the header queue 11 into the conversion header queue 16. Meanwhile, if the input ATM cell is regarded as a non-conforming cell, the traffic control unit 15 outputs the cell discard signal to the output cell processing unit 17. Then, the output cell processing unit 17 reads and discards the storage data of the data queue 12 according to the cell discard signal outputted from the traffic control unit 15.

If the CT is '001', that is, if the input ATM cell corresponds to the VBR.1 service, the traffic control unit 15 performs the process as shown in FIGS. 11A and 11B on the basis of the TAT1 and the TAT2 of the TMC and the GTIC, so as to judge the conformance of the ATM cell. At this time, since the flow chart of FIG. 11B is the same as that of FIG. 11A, except for the use of TAT2, the detailed description thereof is omitted. Here, the TAT2 signifies the theoretical arrival time of the ATM cell inputted as the second bucket.

If the ATM cell is determined to be a conforming cell, the traffic control unit 15 stores the TAT1 and the TAT2 as updated in steps S33 and S43 in the TAT1 field and in the TAT2 field, respectively, of the traffic control memory 14, and writes the information of the header queue 11 into the conversion header queue 16.

On the other hand, if the ATM cell is determined to be a non-conforming cell, the traffic control unit 15 outputs a cell discard signal to the output cell processing unit 17 so that the storage data of the data queue 12 can be discarded by the output cell processing unit 17.

If the CT is '010', that is, if the ATM cell corresponds to the VBR.2 service, the traffic control unit 15 accesses the header queue 11 to check the CLP field. If the CLP field is '0', the traffic control unit 15 performs the process as shown in FIGS. 11A and 11B on the basis of the TAT1 And TAT2 of the TMC and the GTIC, to determine a conformance of the ATM cell.

If the input ATM cell is determined to be a conforming cell, the traffic control unit 15 stores the TAT1 and the TAT2, as updated in steps S33 and S43, respectively, in the TAT1 field and in the TAT2 field of the traffic control memory 14, and writes the information of the header queue 11 into the conversion header queue 16. On the other hand, if the ATM cell is determined to be a non-conforming cell, the traffic control unit 15 outputs a cell discard signal to the output cell processing unit 17 so that the storage data of the data queue 12 can be discarded by the output cell processing unit 17.

If the CLP field is '1', however, the traffic control unit 15 performs the process as shown in FIG. 11B on the basis of the TAT2 of the TMC, so as to determine a conformance of the ATM cell. If the input ATM cell is determined to be a conforming cell, the traffic control unit 15 stores the TAT2 updated in step S43 in the TAT2 field of the traffic control memory 14, and writes the information of the header queue 11 into the conversion header queue 16. On the other hand, if the ATM cell is determined to be a non-conforming cell, the traffic control unit 15 outputs a cell discard signal to the output cell processing unit 17 so that the storage data of the data queue 12 can be discarded by the output cell processing unit 17.

Next, if the CT is '011', that is, if the input ATM cell corresponds to the VBR.3 service, the traffic control unit 15 checks the CLP field of the header queue 11. If the CLP field is '0', the traffic control unit 15 performs the process as shown in FIGS. 11A and 11B on the basis of the TAT1 And TAT2 of the TMC and the GTIC, to determine a conformance of the ATM cell.

If the input ATM cell is determined to be a conforming cell, the traffic control unit 15 stores the TAT1 and the TAT2, as updated in steps S33 and S43 respectively in the TAT1 field and in the TAT2 field of the traffic control memory 14, and writes the information of the header queue 11 into the conversion header queue 16.

If, however, the ATM cell is determined to be a non-conforming cell, the traffic control unit 15 performs the process as shown in FIG. 11B on the basis of the TAT2 of the TMC and the GTIC, to determine the conformance of the ATM cell. If the input ATM cell is determined to be a conforming cell, the traffic control unit 15 stores the TAT2, as updated in step S43 in the TAT2 field of the traffic control memory 14, and writes the information of the header queue 11 into the conversion header queue 16.

In this respect, the middle bit of the PT field is converted to '1', representing the occurrence of congestion in the corresponding ATM cell.

On the other hand, if the ATM cell is judged again as a non-conforming cell, the traffic control unit 15 outputs a cell discard signal to the output cell processing unit 17 so that the storage data of the data queue 12 can be discarded by the output cell processing unit 17.

Meanwhile, if the CLP field is '1', the traffic control unit 15 performs the process as shown in FIG. 11B on the basis of the TAT2 of the TMC, to determine a conformance of the ATM cell.

If the input ATM cell is determined to be a conforming cell, the traffic control unit 15 stores the TAT2, as updated in step S43, in the TAT2 field of the traffic control memory 14, and writes the information of the header queue 11 into the conversion header queue 16. On the other hand, if the ATM cell is determined to be a non-conforming cell, the traffic control unit 15 outputs a cell discard signal to the output cell processing unit 17 so that the storage data of the data queue 12 can be discarded by the output cell processing unit 17.

If the CT is '101', that is, if the input ATM cell corresponds to the UBR.1 service, the traffic control unit 15 determines the conformance of the ATM cell according to the process as shown in FIG. 11A on the basis of the TAT1 of the TMC and the GTIC.

If the input ATM cell is determined to be a conforming cell, the traffic control unit 15 stores the TAT1, as updated in step S33 in the TAT1 field of the traffic control memory 14, and writes the information of the header queue 11 into the conversion header queue 16.

If, however, the input ATM cell is determined to be a non-conforming cell, the traffic control unit 15 checks the CLP field stored in the header queue 11. If the CLP field is '0', the traffic control unit 15 writes the information of the header queue 11 into the header queue 16, and the PT field is converted to '1' to be written. If the CLP field is '1', the traffic control unit 15 outputs the cell discard signal to the output cell processing unit 17 so that the output cell processing unit 17 can discard the storage data of the data queue 12.

If the CT is '110', that is, if the input ATM cell corresponds to the ABR service, the traffic control unit 15 checks the CLP field stored in the header queue 11. If the CLP field is '0', the traffic control unit 15 determines a conformance of the ATM cell according to the process as shown in FIG. 11A on the basis of the TAT1 of the TMC and the GTIC.

If the input ATM cell is determined to be a conforming cell, the traffic control unit 15 stores the TAT1, as updated in step S33 in the TAT1 field of the traffic control memory 14, and writes the information of the header queue 11 into the conversion header queue 16.

If, however, the ATM cell is judged to be a non-conforming cell, the traffic control unit 15 outputs the cell discard signal to the output cell processing unit 17 so that the output cell processing unit 17 can discard the storage data of the data queue 12.

In each operation, the traffic control unit 15 increases the values of the TICC, the GTIC, and the ICC2 for the inputted ATM cells by '1', and if it falls on the cell discard condition, the traffic control unit 15 increases the values of the TNCC, the NCC1 and the NCC2 by '1'.

As herein described, in the apparatus for managing traffic of an ATM switching system according to a preferred embodiment of the present invention, the traffic descriptor defined in establishing the call is converted to a parameter and stored in the traffic control memory, and when the ATM cell is inputted, the CT field stored in the traffic control memory is checked to discriminate the conformance type of the corresponding ATM cell.

Moreover, the traffic parameter of the ATM cell and the GCRA parameter stored in the traffic control memory are compared in the discriminated conformance type, thereby performing the traffic management operation such as tagging, discarding, and policing for the ATM cell.

Accordingly, since various conformance definitions can be supported for the input ATM cell, an effective traffic management function can be obtained.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for managing traffic of an Asynchronous Transfer Mode (ATM) switching system, comprising:

an input cell processor to separate an ATM cell into a header part and a data part;

a header queue to store the header part separated in the input cell processor;

a traffic control memory to store an input coefficient value of the ATM cell and a traffic parameter;

a traffic control unit to determine a conformance measurement type of the ATM cell and compare traffic information of the ATM cell in the determined conformance measurement type and the traffic parameter to discriminate a conformance of the cell; and a memory connection unit to access the traffic control memory, to transfer the traffic information of the ATM cell to the traffic control unit, and store a processing result of the traffic control unit in the traffic control memory.

2. The system of claim 1, wherein the memory connection unit reads a VPI/VCI field of a header part stored in the header queue to access a traffic management content (TMC) of the traffic control memory, and wherein the conformance measurement type is determined on the basis of a bit value of a conformance type (CT) field of the TMC.

3. The system of claim 1, further comprising:

a data queue to store the data part of the ATM cell;

a conversion header queue to store information of the header of queue of a conforming ATM cell; and an output cell processor to combine the outputs of the data queue and the conversion header queue to output the ATM cell if the ATM cell is a conforming cell, and discard the data of the data queue if the ATM cell is a non-conforming cell.

4. The system of claim 1, wherein the traffic control memory comprises a traffic management content TMC, which stores a traffic parameter of the ATM cell.

5. The system of claim 4, wherein the TMC comprises:

a conformance type (CT) field representing a conformance definition type of the ATM cell; and a plurality of fields for storing information corresponding to first and second buckets.

6. The system of claim 5, wherein the first and second buckets are one of a peak cell rate (PCR) and a sustainable cell rate (SCR) bucket.

7. The system of claim 5, wherein the conformance type corresponds to one of a constant bit rate service, a variable bit rate service, an unspecified bit rate service, and an available bit rate service.

8. The system of claim 7, wherein the constant bit rate service is CBR.1, the variable bit rate service is one of VBR.1, VBR.2 and VBR.2, the unspecified bit rate service is one of UBR.1 and UBR.2, and the available bit rate service is ABR.

9. The system of claim 5, wherein the conformance type corresponds to one of CBR.1, VBR.1, VBR.2, VBR.3, UBR.1, UBR.2, and ABR.

10. The system of claim 5, wherein the plurality of fields comprises:

a first increment factor field storing a first parameter of the first bucket; a first limit factor field storing a second parameter of the first bucket;

a first theoretical arrival time field storing a theoretical arrival time of the first bucket;

a first ingress cell counter field storing a count value of the ATM cells inputted to the first bucket; and a first non-conforming cell counter field storing count values of the discarded or tagged cells among the cells inputted to the first bucket.

11. The system of claim 5, wherein the plurality of fields comprises:

a second increment factor field storing a first parameter of the second bucket;

a second limit factor field storing a second parameter of the second bucket;

a second theoretical arrival time field storing a theoretical arrival time of the second bucket;

a second ingress cell counter field storing a count value of the ATM cells inputted to the second bucket; and a second non-conforming cell counter field storing count values of the discarded or tagged cells among the cells inputted to the second bucket.

12. The system of claim 11, wherein the first parameter is an Increment Parameter (I) and the second parameter is a Limit Parameter (L).

13. The system of claim 1, wherein the traffic control memory comprises a global statistic counter (GSC) unit, which stores a count value associated with the ATM cell.

14. The system of claim 13, wherein the GSC unit comprises:

a total ingress cell counter register to count the number of ATM cells inputted;

a total non-conforming cell counter register to count discarded or tagged cells among the inputted ATM cells; and a global time indication counter register to count and store a cell slot time regardless of inputting of cell.

15. A method for managing traffic of an Asynchronous Transfer Mode (ATM) switching system, comprising the steps of:

storing a traffic parameter in a traffic control memory;

receiving and separating an ATM cell into a header part and a data part; storing the header part in a header queue and the data part in a data queue;

reading a VPI/VCI field stored in the header queue and accessing a traffic management content (TMC) of the traffic control memory; and determining a prescribed conformance measurement type on the basis of a bit value of a conformance type (CT) field of the TMC and checking a conformance of the ATM cell according to the prescribed conformance measurement type.

16. The method of claim 15, further comprising the steps of:

writing the header part of conforming ATM cells stored in the header queue into a conversion header queue;

combining the data stored in the data queue and the header information stored in the conversion header queue and outputting an ATM cell; and reading and discarding the data part of the non-conforming ATM cells.

17. The method of claim 15, wherein a TMC stores the traffic parameter of the ATM cell,and a global statistic counter (GSC) unit stores the count value corresponding to the ATM cell.

18. The method of claim 17, wherein the TMC comprises:

the conformance type (CT) field representing a conformance measurement type of an input ATM cell;

first and second increment factor fields for storing 'I' parameter of a first and a second buckets;

first and second limit factor fields for storing 'L' parameter of the first and the second buckets;

first and second theoretical arrival time (TAT) field for storing a theoretical arrival time of the first and second buckets;

first and second ingress cell counter fields for storing count value of the ATM cells inputted to the first and second buckets; and first and second non-conforming cell counter fields for storing count value of the discarded or tagged cells among the cells inputted to the first and second buckets.

19. The method of claim 18, wherein the first and the second buckets are one of a peak cell rate (PCR) and a sustainable cell rate (SCR) bucket.

20. The method of claim 17, further comprising the steps of:

counting the ATM cells as inputted in a total ingress cell counter register;

counting discarded or tagged cells among the inputted entire ATM cells in a total non-conforming cell counter register; and counting a cell slot time and storing it, regardless of inputting of cell in a global time indication counter register.

21. An asynchronous transfer mode (ATM) switching system, comprising:

an input circuit coupled to receive an ATM cell having a header part and a data part;

an ATM control unit coupled to receive only the header part of the ATM cell and determine a conformance of the ATM cell based on information from the header part and a traffic parameter stored in the ATM control unit, wherein the ATM control circuit comprises a traffic management content TMC, configured to store a traffic parameter of the ATM cell, and wherein the TMC comprises a conformance type (CT) field representing a conformance definition type of the ATM cell; and an output circuit coupled to receive and combine the output of the ATM header and cell data for conforming cells, and to discard the ATM data of non-conforming cells.

22. The system of claim 21, wherein the input circuit comprises:

an input cell processor unit coupled to receive the ATM cell;

a header queue coupled to the input cell processor unit to store the header part; and a data queue coupled to the input cell processor unit to store the data part.

23. The system of claim 21, wherein the ATM control unit comprises:

a memory connection unit coupled to receive the header data from the header queue;

a traffic control memory coupled to the memory connection unit to store the traffic parameter and a conformance processing result; and a traffic control unit coupled to the memory connection unit to determine the conformance measurement type of the ATM cell and determine the conformance of the ATM cell.

24. The system of claim 21, wherein the output circuit comprises:

a conversion header queue coupled to the traffic control unit to receive the header part of conforming ATM cells; and an output cell processing unit coupled to receive and combine the header part and the cell data of conforming ATM cells, and to receive and discard the header part of non-conforming ATM cells.

25. The system of claim 21, wherein the ATM control unit is configured to determine the conformance of an ATM cell having a conformance measurement type of constant bit rate, variable bit rate, unspecified bit rate, and available bit rate.

26. The system of claim 31, wherein the ATM control unit is configured to determine the conformance of an ATM cell having a conformance measurement type of CBR.1, VBR.1, VBR.2, VBR.3, UBR.2, and ABR.

27. The system of claim 21, wherein the ATM control unit reads a VPI/VCI field of the received header part to access a traffic management content (TMC) of the ATM control unit, and wherein a conformance measurement type is determined on a basis of a bit value of a conformance type field of the TMC.

* * * * *